United States Patent
Nisbet

[11] 3,938,407
[45] Feb. 17, 1976

[54] VARIABLE RATIO PARKING BRAKE CONTROL

[75] Inventor: Kenneth J. Nisbet, Ann Arbor, Mich.

[73] Assignee: Ford Motor Company, Dearborn, Mich.

[22] Filed: Aug. 28, 1974

[21] Appl. No.: 501,422

[52] U.S. Cl. .................................. 74/516; 74/518
[51] Int. Cl.² .................................. G05G 1/04
[58] Field of Search .......... 74/501 R, 512, 516, 518

[56] References Cited
UNITED STATES PATENTS

| | | | |
|---|---|---|---|
| 1,601,649 | 9/1926 | Schaeffer | 74/518 |
| 2,184,294 | 12/1939 | Fergueson | 74/518 |
| 2,834,184 | 5/1958 | Ingres | 74/518 X |
| 3,466,942 | 9/1969 | Keller et al. | 74/516 |
| 3,739,579 | 6/1973 | Lutz | 74/518 |

Primary Examiner—Kenneth W. Sprague
Attorney, Agent, or Firm—Clifford L. Sadler; Keith L. Zerschling

[57] ABSTRACT

According to the present disclosure a variable ratio parking brake control has a foot operated lever with a cam slot. A guide member is pivotally connected to the lever and it also has a cam slot. A clevis that is connected to a parking brake cable has a bearing pin which is slidably supported within the cam slots of the lever and the guide member. A spring is supported by the guide member and exerts a spring force urging the clevis to the outer ends of the two cam slots. The clevis is slidable from the outer ends of the cam slots to the inner ends of the slots in response to both displacement of the lever from a brake released position to a brake applied position and a load on the clevis that exceeds an amount determined by the force of the spring. The displacement of the clevis from the outer end of the cam slot of the lever to the inner end of the slot increases the mechanical advantage ratio of the brake control system. The increase in ratio occurs in response to displacement of the lever and the tension in the brake cable.

2 Claims, 4 Drawing Figures

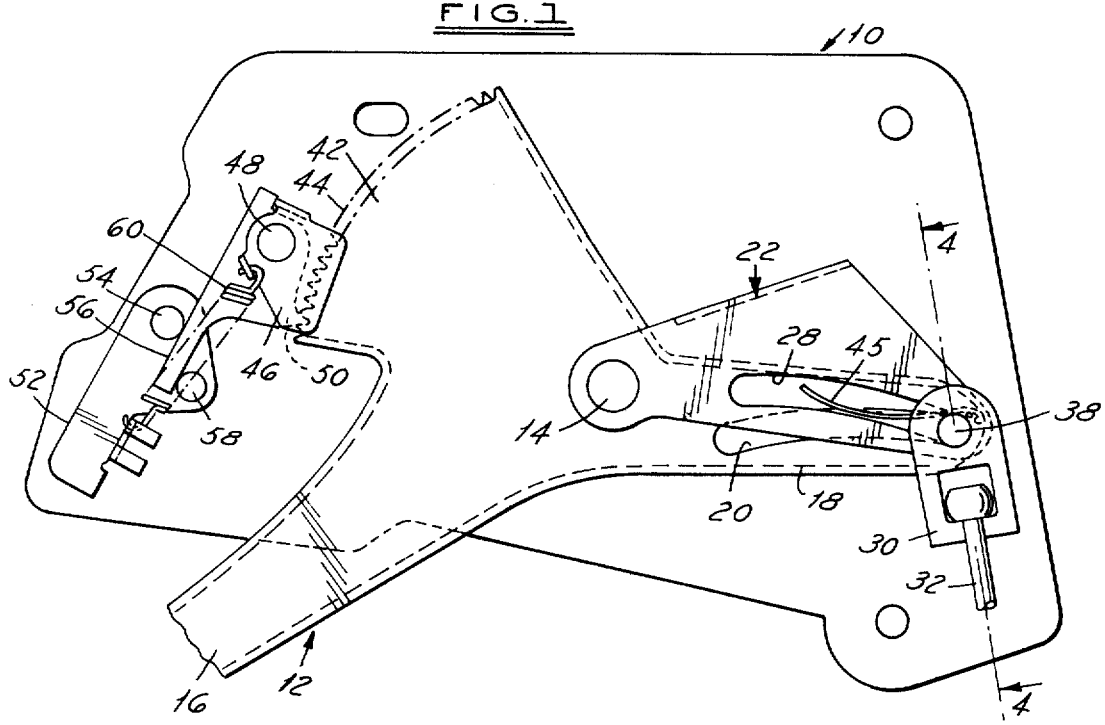
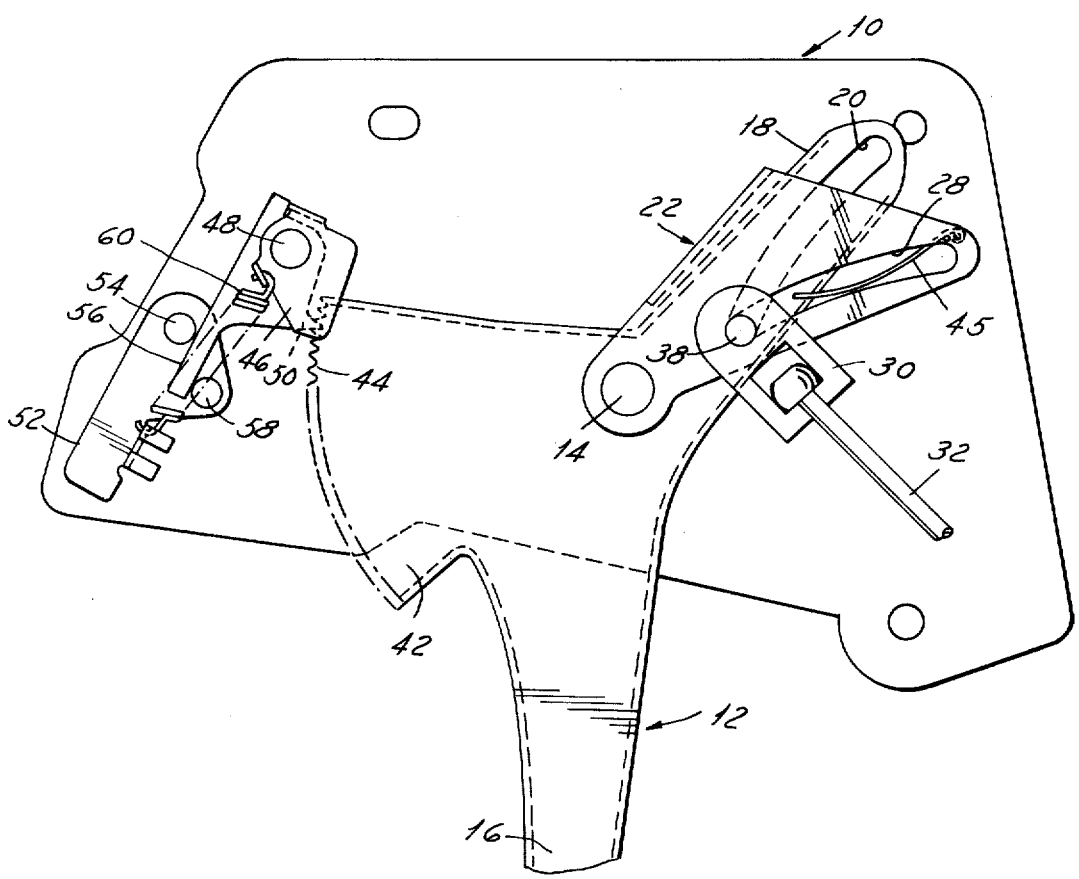

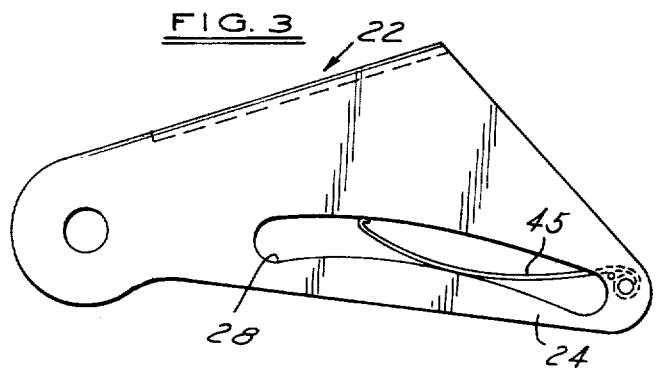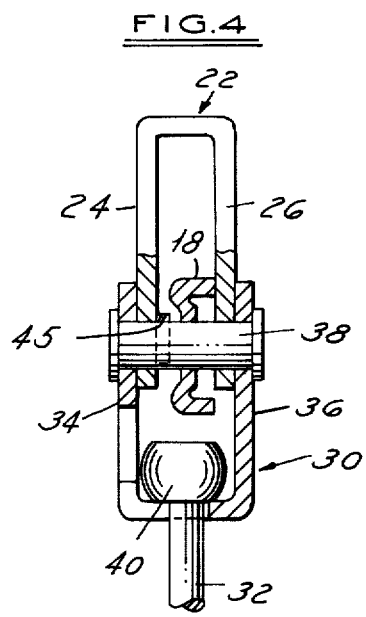

3,938,407

VARIABLE RATIO PARKING BRAKE CONTROL

BACKGROUND OF THE DISCLOSURE

With the parking brake system of the average motor vehicle, the initial movement of the parking brake pedal merely takes up the normal slack in the brake cable and in related mechanisms. There is a certain amount of lost motion that occurs in merely moving the brake shoes from their retracted position into contact with the brake drums. Relatively low efforts are required by the vehicle operator to move the parking brake pedal through this initial phase prior to the actual brake application.

It is an object of this invention, therefore, to provide a parking brake control for applying the parking brakes of a motor vehicle wherein the control effects a rapid movement of the brake shoe assemblies into engagement with the brake drums upon a relatively short initial stroke of the brake pedal and has an effective mechanical advantage ratio that is lower than is desired for high pressure brake application.

It is also an object of the invention to provide a brake control that accomplishes the foregoing object and wherein the effective mechanical advantage ratio is increased in response to both pedal displacement and brake cable tension when the brake shoes engage the brake drums thereby providing a greater force to apply the brake shoes with a lower effort requirement on the part of the vehicle operator.

BRIEF SUMMARY OF THE DISCLOSURE

In the presently preferred embodiment of this invention a parking brake control system includes a brake pedal lever that is pivotally connected by a pivot pin to a housing. The pedal lever has an elongated cam slot. A guide member is pivotally supported on the housing by the same pivot pin and it also has an elongated cam slot. A clevis is connected to a parking brake cable and has a bearing pin that is situated within the two cam slots. A spring is supported by the guide member and engages the bearing pin. The spring urges the bearing pin to the outer end of the cam slots.

When the brake pedal is angularly displaced by the vehicle operator, the bearing pin will tend to move the length of the cam slot in the pedal lever to a location closer to the pivot axis for the pedal. The displacement of the bearing pin and clevis will be retarded by the guide member and the spring carried thereby. The mechanism requires that the tensile load in the brake cable exceed a predetermined minimum before the clevis and bearing pin may be displaced against the force of the spring. Therefore, the parking brake control maintains a low mechanical advantage ratio until the brake shoes are in full engagement with the brake drums and the load upon brake cable exceeds the amount normally required to merely move the shoes against the force of their retractor springs. When the tension in the brake cable surpasses the predetermined amount, the bearing pin moves in the cam slot of the pedal lever toward the inner end of the slot and the mechanical advantage ratio of the brake system is correspondingly increased.

The brake pedal includes an arcuate portion with a series of ratchet teeth and the housing pivotally supports a pawl which engages the ratchet teeth. The pawl is designed to hold the brake pedal in its brake applied position. Means are provided for releasing the pawl to permit the brake pedal to return to its brake released position.

In most variable ratio pedal systems for parking brakes the mechanism for changing the mechanical advantage ratio is dependent solely upon the displacement of the pedal. In the preferred embodiment of the present invention displacement of the clevis and bearing pin from a low ratio position to a high ratio position is dependent in part upon the tension in the brake cable.

BRIEF DESCRIPTION OF THE DRAWING

The many objects and advantages of a variable ratio parking brake control constructed in accordance with the present invention will become apparent upon consideration of the following detail description and the accompanying drawings, in which:

FIG. 1 is a side elevational view of a parking brake control illustrating the presently preferred form of the invention. The control is shown in a brake released condition.

FIG. 2 is a side elevational view of the parking brake control of FIG. 1 showing the control in a brake applied position.

FIG. 3 is a side elevational view of the guide member for the brake control of FIG. 1.

FIG. 4 is a sectional view taken along section line 4—4 of FIG. 1.

DETAILED DESCRIPTION OF THE PRESENTLY PREFERRED EMBODIMENT

Referring now to the drawings, wherein the presently preferred embodiment of this invention is illustrated, FIG. 1 shows an improved variable ratio parking brake control. The control includes a stamped metal housing 10 to which a pedal 12 is pivotally connected by a pivot pin 14. The pedal 12 has a depending portion 16 with a pedal pad (not shown) secured to its end. An elongated portion 18 of the pedal lever 12 extends forwardly from the pivot pin 14. An arcuate cam slot 20 is provided in the portion 18 of the pedal 12.

A guide member 22 is pivotally supported on the pivot pin 14 and has a pair of spaced side walls 24 and 26 that are disposed on either side of extending portion 18 of the pedal lever 12. Aligned cam slots 28 are formed in the side walls 24 and 26 of the guide member 22.

A clevis 30 connects a brake cable 32 to the pedal lever 12. The clevis 30 has a pair of upwardly extending leg portions 34 and 36 which are situated on either side of the side walls 24 and 26 of the guide member 22. A bearing pin 38 interconnects the leg portions 34 and 36 of the clevis 30 and extends through the cam slots 28 in the guide member 22 and the cam slot 20 in the pedal lever 12. The brake cable 30 has a stop member 40 swaged to its end and seated within a slot in the clevis 30. The other end of the brake cable 32 is coupled to a wheel brake.

The guide member 22 has a leaf spring 45 secured thereto adjacent the outer end of the cam slot 28 in the side wall 24. The leaf spring 45 is arranged to engage the bearing pin 34 of the clevis 30 and to urge it toward the outer end of the cam slots 20 and 28.

Ratchet means is provided for releasably holding the brake pedal lever 12 in a brake applied position. The brake pedal lever 12 has a sector portion 42 with a series of ratchet teeth 44. A pawl 46 is pivotally connected to the housing 10 by a pivot pin 48. The pawl 46 has a single tooth 50 that is arranged to engage the ratchet teeth 44. A release lever 52 is pivotally connected to the housing 10 by pivot pin 54. The pawl 46 has an extending arm 56 which engages an abutment pin 58 carried by the release lever 52. A coil spring 60 extends between the release lever 52 and the pawl 46. The coil spring 60 holds the extending arm 56 of the pawl in engagement with the abutment pin 58 and the tooth 50 in engagement with the ratchet teeth 44.

OPERATION

The pedal 12 is a lever of the first class and is angularly displaceable about the pivot axis of the pivot pin 14 from a brake released position as seen in FIG. 1 to a brake applied position as seen in FIG. 2. In the brake released position, the leaf spring 45 supported by the guide member 22 urges the bearing pin 38 of the clevis toward the outer end of the cam slot 20 in the pedal lever 12.

It will be noted from the drawing that the cam slot 20 extends in a generally radially direction with respect to the axis of the pivot pin 14. When the bearing pin 34 is at the outer end of the cam slot 20 the pedal system will have its lowest mechanical advantage ratio. When the lever arm 16 is depressed by the vehicle operator causing the pedal lever 12 to pivot counterclockwise about the pin 14, the brake cable 34 will be drawn upwardly. Slack in the cable system will be removed and the brake shoes will move from a retracted position into engagement with the brake drum. As long as the tension in the cable 32 is less than a predetermined amount, the leaf spring 45 will maintain the clevis 30 at the outer end of the cam slot 20. In this position, displacement of the pedal lever 12 will cause maximum displacement of the brake cable 32.

As the shoes engage the brake drum, the loading upon the brake cable 32 will increase rapidly. When the pedal lever 12 moves towards its brake applied position of FIG. 2, the geometry of the cam slot 20 will be such that the bearing pin 34 for the clevis 30 will be urged by tension in the cable 32 toward the inner end of the slot. The movement of the bearing pin 34 toward the inner end of the slot 20 will be resisted by the spring force of the leaf spring 45. When the tension in the brake cable 32 reaches a predetermined amount, the load on the bearing pin 34 will overcome the force of the leaf spring 45 and the bearing pin will move along the cam slot 20 toward its inner end.

As the bearing pin 34 moves, the guide member 22 will be angularly displaced. Because the guide member 22 is urged by the leaf spring 45 in a counterclockwise direction, the inward movement of the bearing pin 38 will cause clockwise rotation of the member 22 (relative to pedal lever 12) against the force of the spring 45. Once the bearing pin 38 has moved inwardly to an extent that it becomes disengaged from the spring 45, the pin 38 is free to move to the inner end of the cam slots 20 and 28 without further spring resistance.

When the bearing pin 34 is at the inner end of the slot 20 adjacent the pivot pin 14 the pedal system will have its maximum mechanical advantage ratio. In this condition displacement of the lever arm 16 by the motor vehicle operator will produce the maximum tension in the brake cable 32 relative to the force applied to the pedal pad.

Due to the geometry of the pawl 46, it will pivot freely when the pedal lever 12 is displaced counterclockwise from its FIG. 1 to its FIG. 2 position. When the applying force is released from the lever arm 16 the tooth 50 will engage the gap between two of the ratchet teeth 44 and the pawl 46 will hold the pedal lever 12 in the brake applied position. When it is desired to release the brake, the release lever 52 is rotated clockwise and engagement of the abutment pin 58 with the arm 54 will cause a corresponding clockwise rotation of the pawl 46. Clockwise movement of the pawl 46 will withdraw the tooth 50 from its engagement with the ratchet teeth 44 whereby the pedal lever 12 will be free to return from its brake applied position to its brake released position.

In summary, the present invention provides a variable ratio parking brake control designed to permit rapid brake cable takeup with an initial low pedal ratio and low pedal effort. After initial displacement, the pedal system provides a final high pedal ratio. The bearing pin 38 stays in its outer low ratio position in the cam slot 20 until enough force is applied to the retaining spring 45 and guide member 22 to allow movement along the cam slot 20 thus increasing the pedal ratio incrementally. The characteristics of the retaining spring 45 determine the pattern of the ratio change. The slopes of the cam slots 20 and 28 of the pedal lever 12 and the guide member 22 are contoured to allow no cable travel loss during the ratio change, while allowing minimal resistance and sufficient force to permit bearing pin travel.

The foregoing description present the presently preferred embodiment of this invention. Details of construction have been set forth for purposes of illustration and are not to be considered limits of the invention. Alterations and modifications of the invention may occur to those skilled in the art that will come within the scope and spirit of the following claims.

I claim:

1. A variable ratio brake control for a vehicle brake;
   said control including a pivotally supported manually operated lever having a cam surface;
   said lever being angularly displaceable from a brake released position to a brake applied position;
   said cam surface having an outer end remote from the pivot axis of said lever and an inner end closer to said pivot axis than said outer end;
   a force transmitting device slidably engaging said cam surface and constructed to be coupled to a wheel brake;
   a spring means engaging said device and urging said device to said outer end of said cam surface;
   said device being displaced from said outer end to said inner end in response to displacement of said lever from said brake released position to said brake applied position and a brake applying load on said force transmitting device that exceeds a predetermined amount.

2. A variable ratio brake control for a cable actuated vehicle brake;
   said control including a housing, a manually operated lever and pivot means connecting said lever to said housing;
   said lever being angularly displaceable from a brake released position to a brake applied position;
   said lever having a cam slot with an outer end remote from the pivot axis of said pivot means and an inner end closer to said pivot axis than said outer end;
   a guide member pivotally connected to said housing by said pivot means and angularly displaceable relative to said lever;

said guide member having a cam slot with an outer end remote from said pivot axis and an inner end closer to said pivot axis than said just mentioned outer end;

said cam slot of said member overlapping said cam slot of said lever and cooperating therewith to define an opening of a size less than the size of said lever cam slot or said member cam slot;

a force transmitting device disposed in said opening and slidably supported in said cam slot of said lever and said cam slot of said member;

said device being constructed to be coupled to a brake cable;

spring means supported by said member exerting a spring force urging said device toward said outer end of said member cam slot and said outer end of said lever cam slot;

said device being slidable from said outer end of said lever cam slot to said inner end of said lever cam slot in response to displacement of said lever from said brake released position to said brake applied position and a brake applying load on said force transmitting device that exceeds a predetermined amount.

* * * * *